(12) United States Patent
Singh et al.

(10) Patent No.: US 12,554,871 B2
(45) Date of Patent: Feb. 17, 2026

(54) SYSTEMS, METHODS, AND COMPUTER-READABLE MEDIA FOR SECURE AND PRIVATE DATA VALUATION AND TRANSFER

(71) Applicants: Gursimran Singh, Delta (CA); Ahnaf Tazwar Ayub, Vancouver (CA); Chendi Wang, Vancouver (CA); Lanjun Wang, Markham (CA); Yong Zhang, Richmond (CA)

(72) Inventors: Gursimran Singh, Delta (CA); Ahnaf Tazwar Ayub, Vancouver (CA); Chendi Wang, Vancouver (CA); Lanjun Wang, Markham (CA); Yong Zhang, Richmond (CA)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 757 days.

(21) Appl. No.: 17/712,952

(22) Filed: Apr. 4, 2022

(65) Prior Publication Data
US 2023/0315885 A1 Oct. 5, 2023

(51) Int. Cl.
G06F 21/62 (2013.01)
G06V 10/764 (2022.01)
G06V 10/774 (2022.01)

(52) U.S. Cl.
CPC ........ *G06F 21/6218* (2013.01); *G06V 10/764* (2022.01); *G06V 10/774* (2022.01)

(58) Field of Classification Search
CPC . G06F 21/6218; G06V 10/774; G06V 10/764
USPC .......................................................... 726/27
See application file for complete search history.

(56) References Cited

U.S. PATENT DOCUMENTS

| | | | |
|---|---|---|---|
| 11,507,836 B1 * | 11/2022 | Kurz | G06T 7/50 |
| 11,544,406 B2 * | 1/2023 | Edge | G06F 18/214 |
| 2020/0193309 A1 * | 6/2020 | Hazard | G06N 5/041 |
| 2021/0256383 A1 * | 8/2021 | Wang | G06N 3/084 |

(Continued)

FOREIGN PATENT DOCUMENTS

WO WO-2017222902 A1 * 12/2017 ............. G06N 20/00

OTHER PUBLICATIONS

Ghiassi, TrustNet: Learning from Trusted Data Against (A)symmetric Label Noise, Jul. 13, 2020 (Year: 2020).*

(Continued)

*Primary Examiner* — Lynn D Feild
*Assistant Examiner* — Saad Ahmad Abdullah (57) ABSTRACT

Systems, methods and computer-readable media for generating, by a first entity, a set of synthetic data samples that represent a corresponding set of original data samples; sending, by the first entity, the set of synthetic data samples for use by a second entity to generate a set of second entity predictions for the set of synthetic data samples using a machine learning (ML) model that has been trained using a second entity dataset; sending, by the first entity, for a third entity, a set of trusted labels corresponding to the set of original data samples; and receiving, by the first entity, from the third entity, valuation information for the second entity dataset that is based on a comparison by the third entity of the set of trusted labels and the set of second entity predictions.

20 Claims, 7 Drawing Sheets

(56) References Cited

U.S. PATENT DOCUMENTS

2022/0067450 A1* 3/2022 Verma ............... G06F 18/214

OTHER PUBLICATIONS

Near, Differentially Private Synthetic Data, May 3, 2021 (Year: 2021).*
Abufadda, A Survey of Synthetic Data Generation for Machine Learning. Dec. 23, 2021 (Year: 2021).*
Abufadda (N.P.L "A Survey of Synthetic Data Generation for Machine Learning"), Jan. 17, 2022 (Year: 2022).*
Liu, Jinfei, et al. "Dealer: an end-to-end model marketplace with differential privacy." Proceedings of the VLDB Endowment 14.6 2021.
Azcoitia, Santiago Andrés, et al. "Try Before You Buy: A practical data purchasing algorithm for real-world data marketplaces." arXiv preprint arXiv:2012.08874 2020.
Chen, Lingjiao et al., "Towards model-based pricing for machine learning in a data marketplace." Proceedings of the 2019 International Conference on Management of Data. 2019.
Jordon, James et al., "PATE-GAN: Generating synthetic data with differential privacy guarantees." International conference on learning representations. 2018.
Chen, Dingfan et al, Gs-wgan: A gradient-sanitized approach for learning differentially private generators. arXiv preprint arXiv:2006.08265 2020.
Harder, Frederik et al., "DP-MERF: Differentially Private Mean Embeddings with RandomFeatures for Practical Privacy-preserving Data Generation." International Conference on Artificial Intelligence and Statistics. PMLR 2021.
Cao, Tianshi, et al. "Don't Generate Me: Training Differentially Private Generative Models with Sinkhorn Divergence." Advances in Neural Information Processing Systems 34 2021.
Zhang, Hongyi, et al. "mixup: Beyond empirical risk minimization." arXiv preprint arXiv:1710.09412 2017.
Huang, Yangsibo, et al. "Instahide: Instance-hiding schemes for private distributed learning." International Conference on Machine Learning. PMLR 2020.
Liu, Zhijian, et al. "DataMix: Efficient Privacy-Preserving Edge-Cloud Inference." Computer Vision-ECCV 2020: 16th European Conference, Glasgow, UK, Aug. 23-28, 2020, Proceedings, Part XI 16. Springer International Publishing 2020.
Halevi, Shai et al., "Algorithms in helib." Annual Cryptology Conference. Springer, Berlin, Heidelberg 2014.
Koutsos, Vlasis, et al. "Agora: A privacy-aware data marketplace." 2020 IEEE 40th International Conference on Distributed Computing Systems (ICDCS). IEEE, 2020.
Carlini, Nicholas, et al. "An Attack on InstaHide: Is Private Learning Possible with Instance Encoding ?. " arXiv preprint arXiv:2011.05315 2020.
Ruoxi Jia, et al. "Towards efficient data valuation based on the shapley value." arXiv preprint arXiv:1902.10275 Aug. 2020.
Yu, Haifei et al. "Data pricing strategy based on data quality." Computers & Industrial Engineering 112 2017.
Fernandez, RC et al. "Data market platforms: Trading data assets to solve data problems." Proceedings of the VLDB Endowment 13.12 2020.
Heckman, Judd Randolph et al. "A pricing model for data markets." iConference 2015 Proceedings 2015.
Yang, Jian et al. "Big data market optimization pricing model based on data quality." Complexity 2019 2019.
Pei, J. "A Survey on Data Pricing: from Economics to Data Science." arXiv preprint arXiv:2009.04462 2020.
Ghorbani, Amirata et al. "Data shapley: Equitable valuation of data for machine learning." arXiv preprint arXiv:1904.02868 2019.

* cited by examiner

Algorithm 1 Private data synthesis (Outline)

Require: Inputs: buyer task dataset $D_B = \{(x_k, y_k)\}_{k=1}^{|D_B|}$. Parameters: learning rate $\eta_t$, proxy batch size $B$, sampled train-model set size $|\Omega_{Tr}|$, sampled val-model set size $|\Omega_V|$, loss-stopping criteria $\zeta$.

1: Initialize $D_P \leftarrow \phi$, $L_v \leftarrow \phi$
2: $\Omega_{Tr} \leftarrow$ learn_models($D_B, |\Omega_{Tr}|$)  ▷ train train-model set with random seed
3: $\Omega_V \leftarrow$ learn_models($D_B, |\Omega_V|$)  ▷ train val-model set with random seed
4: for $(x_k, y_k) \in D_B$ do
5: $\quad C_k \leftarrow \{f_\theta(x_k) | f_\theta \in \Omega_{Tr}\}$  ▷ cache ground truth projections
6: $\quad$ Initialize $\tilde{x}_k^0 \leftarrow \mathcal{N}_{(0,1)}^{|x|}$
7: $\quad$ for $t \in [T]$ do
8: $\quad\quad$ Randomly sample $\Omega_{Tr}^t \subseteq \Omega_{Tr}$ with probability $B/|\Omega_{Tr}|$
9: $\quad\quad$ Compute gradient for utility and security constraints
10: $\quad\quad g_k = \frac{1}{|\Omega_{Tr}^t|}\sum_{n=1}^{|\Omega_{Tr}^t|}\left[\frac{\partial \mathcal{L}(f_{\theta_n}(x_k), f_{\theta_n}(\tilde{x}_k^t))}{\partial f_{\theta_n}(\tilde{x}_k^t)} \cdot \frac{\partial f_{\theta_n}(\tilde{x}_k^t)}{\partial \tilde{x}_k^t}\right] - \frac{\partial \mathcal{D}(x_k, \tilde{x}_k^t)}{\partial \tilde{x}_k^t}$
$\quad\quad$ ▷ use the pre-computed value of $f_{\theta_n}(x_k)$ from the cache $C_k$.
11: $\quad\quad \tilde{x}_k^t = \tilde{x}_k^{t-1} - \eta_t g_k$  ▷ update $\tilde{x}$ from $\tilde{x}_k^{t-1}$ to $\tilde{x}_k^t$
12: $\quad\quad L_k^t \leftarrow \frac{1}{|\Omega_V|}\sum_{n=1}^{|\Omega_V|}[\mathcal{L}(f_{\theta_n}(x_k), f_{\theta_n}(\tilde{x}_k^t))]$  ▷ use $f_{\theta_n}(x_k)$ from $C_k$
13: $\quad\quad$ if $|L_k^t - L_k^{t-1}| < \zeta$ then break  ▷ alternative stopping criteria
14: $\quad$ end for
15: $\quad$ Update $D_P \leftarrow D_P \cup (\tilde{x}_k, y_k)$ and $L_v \leftarrow L_v \cup L_k^t$
16: end for
17: Output: proxy dataset $D_P$ and validation losses $L_v$

SYSTEMS, METHODS, AND COMPUTER-READABLE MEDIA FOR SECURE AND PRIVATE DATA VALUATION AND TRANSFER

RELATED APPLICATIONS

This is the first application related to the present disclosure.

FIELD

The present disclosure is related to systems, methods, and computer-readable media for a fair, secure and private data valuation and transfer.

BACKGROUND

Machine learning (ML) technology has revolutionized and achieved state-of-the-art performance in many areas like computer vision, natural language processing, and automated driving vehicles. The creation of accurate ML models can be highly dependent on access to large quantities of high quality and diverse training data. Often, the process of collecting data is hard and time consuming which is handled by specialized firms, called data aggregators (also known as data sellers or data providers). On the other hand, data processing organizations (also known as data seekers or buyers) need these datasets to extract valuable business insights or train machine learning models. Hence, data processing organizations seek datasets from data aggregators, in exchange for compensation.

This results in a need for an on-line data marketplace where there are data providers (sellers) who offer their curated datasets for a price, and data seekers (buyers) who want to buy datasets to use to train ML models. In order to facilitate the trade, the sellers and buyers need to interact with each other, which raises many practical challenges of security, fairness, and privacy of the assets of buyers and sellers.

A central problem in a data marketplace is the discovery of potentially useful datasets for a given buyer. An easy way to find potentially useful datasets is using data attributes like size of dataset (volume), attribute names, target names, etc. However, these attributes do not depict the quality of a dataset, and often correlate badly with the buyer task performance. Hence, a more promising solution that has been proposed is the utility-based data marketplace, where the business value a dataset can bring to the buyer's intended task is evaluated using data valuation. In particular, a test dataset provided by the buyer, known as the buyer task dataset, is used to measure the utility of a particular seller dataset.

For example, in a utility-based data marketplace a scenario, the utility of a seller's dataset $D_{Si}$ can be computed based on a buyer task dataset $D_B$ that is provided by the buyer. For a seller's dataset i, the utility is computed using a function $U(D_B, D_{Si})$ which estimates the utility of a seller dataset $D_{Si}$ to help solve the machine learning task represented by the buyer task dataset $D_B$. After obtaining the utility information, a buyer can make an informed decision about which datasets to acquire from what sellers. Also, sellers can use the utility information to price their assets allowing a transparent price discovery.

Utility computation (or data valuation) requires interaction between the datasets of sellers and the buyer. Specifically, it requires buyer task dataset and seller's dataset as inputs. Hence, this computation has to happen at a computer system that is controlled by one of the sellers, the buyer or a third-party facilitator. This requires one (or more) of the market participants to transfer its dataset (assets) to other participants for data valuation.

Due to the ease of replication of digital assets, a malicious receiver of the dataset can illegitimately store, sell, extract value, or extract sensitive private information from the dataset violating the intellectual property and/or privacy of the dataset owner and/or data contributors. Access to a dataset by parties other than the dataset's owner give rise to trust issues due to intellectual property (IP) and privacy violation risks related to the dataset. IP violation risks can include data-item level IP risks that pertain to IP rights in individual data items of the dataset (e.g., "Data-Item IP") and dataset-level IP risks such as statistical information that is inherent in a dataset as a whole (e.g., "Statistical IP"). For example, consider the scenario of a labelled dataset of brain MRI scans of people with certain rare diseases. Such a dataset contains two pieces of potentially-tradeable information of high value. First, the individual raw MRI scans, which are valuable by virtue of their scarcity, each have a high Data-Item IP value. Second, statistical information which can be extracted by, for example, through training a machine learning diagnostic model, provides the entire dataset with a high Statistical IP value. On the other hand, individual data items may also contain sensitive private information about the data contributors which needs to be protected. For example, a picture of a group of humans contain sensitive information like facial expressions, clothes, location, interaction, activities of the humans.

Unauthorized use of datasets can be difficult to detect and prove after-the-fact. For instance, it can be difficult to convincingly demonstrate whether a certain dataset was used in training of a machine learning or enforce copyright violations after a high-value image has been leaked online. Similarly, once a certain sensitive information (related to individual privacy) is leaked, its hard (if not impossible) to reverse the damage it has caused. Hence, sellers and buyers are hesitant to transfer their high-value and private assets (datasets or trained models) to each other or to the facilitator. Accordingly, there is a need for systems and methods that can enable secure and private data valuation and transfer of datasets among parties who may not have established trusting relationships.

SUMMARY

According to a first example aspect of the present disclosure is a computer implemented method that includes generating, by a first entity, a set of synthetic data samples that represent a corresponding set of original data samples; sending, by the first entity, the set of synthetic data samples for use by a second entity to generate a set of second entity predictions for the set of synthetic data samples using a machine learning (ML) model that has been trained using a second entity dataset; sending, by the first entity, for a third entity, a set of trusted labels corresponding to the set of original data samples; and receiving, by the first entity, from the third entity, valuation information for the second entity dataset that is based on a comparison by the third entity of the set of trusted labels and the set of second entity predictions.

According to some example aspects, the method further includes receiving, by the first entity, the second entity dataset from the second entity upon completion by the first entity of a predetermined transfer requirement.

According to one or more of the preceding aspects, the first entity, second entity, and third entity each comprise a respective controlled access computer system and (i) neither the second entity or the third entity have access to the set of original data samples, (ii) the second entity does not have access to the set of trusted labels, and (iii) the first entity does not have access to the second entity dataset prior to the completion by the first entity of the predetermined transfer requirement.

According to one or more of the preceding aspects, the second entity is one of a plurality of second entities, and the method includes sending, by the first entity, the set of synthetic data samples comprises sending the set of synthetic data samples for use by each of the plurality of second entities to generate a respective set of second entity predictions for the set of synthetic data samples using a respective trained machine learning (ML) model that has been trained using a respective second entity dataset that is unique to the second entity, and receiving, by the first entity, from the third entity, valuation information comprises receiving, by the first entity, valuation information from the third entity for each of the respective second entity datasets.

According to one or more of the preceding aspects, generating, by the first entity, the set of synthetic data samples comprises synthesizing a respective data sample for each original data sample based on optimizing both a utility objective that enables consistent valuation information to be generated by the third entity for each of the respective second entity datasets and a security objective that differentiates the synthetic data sample from the original data sample.

According to one or more of the preceding aspects, generating, by the first entity, the set of synthetic data samples includes training multiple training ML models, wherein each training ML model is trained based on a common model architecture and training algorithm as used to train the second entity machine learning (ML) model and each training ML model is trained using a respective randomized version of the set of original data samples. For each of the original data samples, the respective synthetic data sample is synthesized by randomly initializing the synthetic data sample; (a) using a plurality of the multiple training ML models to generate respective model outputs for both the synthetic data sample and the original data sample; (b) updating the synthetic data sample based on: (i) a first gradient computed by the first entity based on a prediction difference between the respective model outputs for the synthetic data sample and the respective model outputs for the original data sample across the multiple training ML models, and (ii) a second gradient computed by the first entity based on a sample distance between the synthetic data sample and the original data sample in a sample space; and (c) repeating (a) and (b) with an objective of minimizing the prediction difference and maximizing the sample distance, until a defined completion criteria is achieved.

According to one or more of the preceding aspects, the original data samples are image samples, the sample space is a pixel space, and the respective model outputs are final layer activations.

According to one or more of the preceding aspects, the second entity is one of a plurality of second entities that each generate a respective set of second entity predictions for the set of synthetic data samples using a respective trained machine learning (ML) model that has been trained using a respective second entity dataset that is unique to the second entity. The method further includes, receiving, by the third entity, the set of trusted labels from the first entity; receiving, by the third entity, the respective sets of second entity predictions generated by each of the plurality of second entities; computing, by the third entity, the valuation information for each of the respective second entity datasets; sending, by the third entity, for the first entity, the valuation information for each of the respective second entity datasets; and sending by the third entity, for each second entity in the plurality of second entities, the valuation information for the respective second entity dataset of the second entity.

According to one or more of the preceding aspects, the valuation information for each respective second entity dataset comprises: an individual utility value that is based on an individual comparison of the set of trusted labels and the set of second entity predictions generated for the second entity, and a marginal utility value that is based on a marginal increase in utility of the respective second entity predictions compared to predictions that includes a plurality of the second entity predictions.

According to one or more of the preceding aspects, the method includes sending to each second entity in the plurality of second entities an indication of a common model architecture and training algorithm for application by the second entity for training its respective ML model, wherein generating, by the first entity, the set of synthetic data samples is based on the common model architecture and training algorithm.

According to one or more of the preceding aspects, the method includes receiving by the second entity, an indication of a common model architecture and training algorithm for application by the second entity for training the respective ML model, and training, by the second entity, the respective ML model based on the common model architecture and training algorithm using the second entity dataset as a training dataset.

According to a further example aspect a method is disclosed for generating a set of synthetic data samples to represent a corresponding set of original data samples. The method includes training multiple training ML models, wherein each training ML model is trained based on a common model architecture and training algorithm and each training ML model is trained using a respective randomized version of the set of original data samples; synthesizing, for each of the original data samples, a respective synthetic data sample by: randomly initializing the synthetic data sample; (a) using a plurality of the multiple training ML models to generate respective model outputs for the synthetic data sample and the original data sample; (b) updating the synthetic data sample based on: (i) a first gradient computed by the first entity based on a prediction difference between the respective model outputs for the synthetic data sample and the respective model outputs for the original data sample across the multiple training ML models, and (ii) a second gradient computed by the first entity based on a sample distance between the synthetic data sample and the original data sample; and (c) repeating (a) and (b) with an objective of minimizing the prediction difference and maximizing the sample distance, until a defined completion criteria is achieved, and storing a final version of the updated synthetic data sample to form part of the set of set of synthetic data samples.

According to a further example aspect, a method is disclosed that includes: receiving, by a facilitator entity, a set of trusted labels from a first entity; receiving, by the facilitator entity, a plurality of sets of second entity predictions provided by a plurality of second entities, the sets of second entity predictions having been generated by respective trained machine learning (ML) models for a common set of input samples, wherein each of the respective trained ML models has a common model architecture and has been trained using a common training algorithm based on a respective unique second entity dataset; computing, by the third entity, valuation information for each of the second entity datasets based on a comparison of the set of trusted labels with the sets of second entity predictions; sending, by the third entity, for the first entity, the valuation information for each of the second entity datasets; and sending by the third entity, for each second entity in the plurality of second entities, the valuation information for at least one of the second entity datasets.

In some aspects, the present disclosure provides a system comprising a processing system configured by instructions to cause the system to perform any of the aspects of the method described above.

In some aspects, the present disclosure provides a computer-readable medium storing instructions for execution by a processing system. The instructions when executed cause the system to perform any of the aspects of the method described above.

BRIEF DESCRIPTION OF THE DRAWINGS

Reference will now be made, by way of example, to the accompanying drawings which show example embodiments of the present application, and in which:

FIG. 3 is a pseudo-code representation of the process of FIG. 2.

The same reference numerals may be used in different figures to denote similar components.

DESCRIPTION OF EXAMPLE EMBODIMENTS

Methods, systems and computer-readable media for secure and private data valuation and transfer of datasets are disclosed. The disclosed solution enables datasets to be accurately evaluated without disclosing information that would enable unauthorised use or copying of the datasets. This is achieved by limiting data access among different entities and also by generating synthetic data for use as a proxy for proprietary datasets during an evaluation process.

The present disclosure describes a computer-implemented solution that can, in some examples, be applied in the context of a data marketplace where a first enterprise (referred to hereinafter as a "buyer") wants to evaluate and potentially acquire one or more datasets from one or more second enterprises (referred to hereinafter as "seller(s)") with the assistance of a third enterprise (referred to hereinafter as a "facilitator"). An enterprise can for example be a company, an institution, a governmental body, non-governmental body, a charity, a firm, a group or other type of organization, or an individual.

The datasets available from sellers (referred to hereinafter as "seller datasets" can be collectively denoted as S: $=\{D_{Si}, i=[1:M]\}$, where $D_{Si}:=\{(x_j, y_j), j=[1: |D_{Si}|]\}$ represents the $i^{th}$ seller dataset, $x_j$ is a $j^{th}$ data sample, $y_j$ is a label assigned to the $j^{th}$ data sample, and M is the total number of available seller datasets under consideration. In order to choose among M different seller datasets, the buyer has a well-represented task dataset $D_B:=\{(x_k, y_k), k=[1: |D_B|]\}$, where $x_k$ is a $k^{th}$ task data sample (also known as an independent variable), and $y_k$ is a trusted label (also known as a dependent variable) assigned to the $k^{th}$ task data sample. As used here, "task dataset" can refer to a dataset that includes a collection of data samples and respective trusted labels that correspond to a target ML task. By way of non-limiting example, a set of images and classification labels for those images can be a task dataset for an ML model image classification task. In other examples, a set of images and object detection labels for those images can be a task dataset for an ML model object detection task. Although examples are discussed in the context of image processing, the present disclosure is not limited to image-based datasets, and can be extended to other types of datasets and tasks such as natural language programming (NLP) tasks and structured data based-prediction tasks.

In the illustrated examples, the set of classes C (i.e., the possible labels in seller dataset labels $\{(y_j)\}$ and possible labels in the buyer dataset trusted labels $\{y_j\}$) is identical for the set of seller datasets S and the buyer dataset $D_{Si}$. As will be described below, in illustrated examples, each seller trains a supervised classification machine learning (ML) model $g_{ei}$ on their individual datasets $D_{Si}$ using a standard machine learning pipeline.

Figure 1:
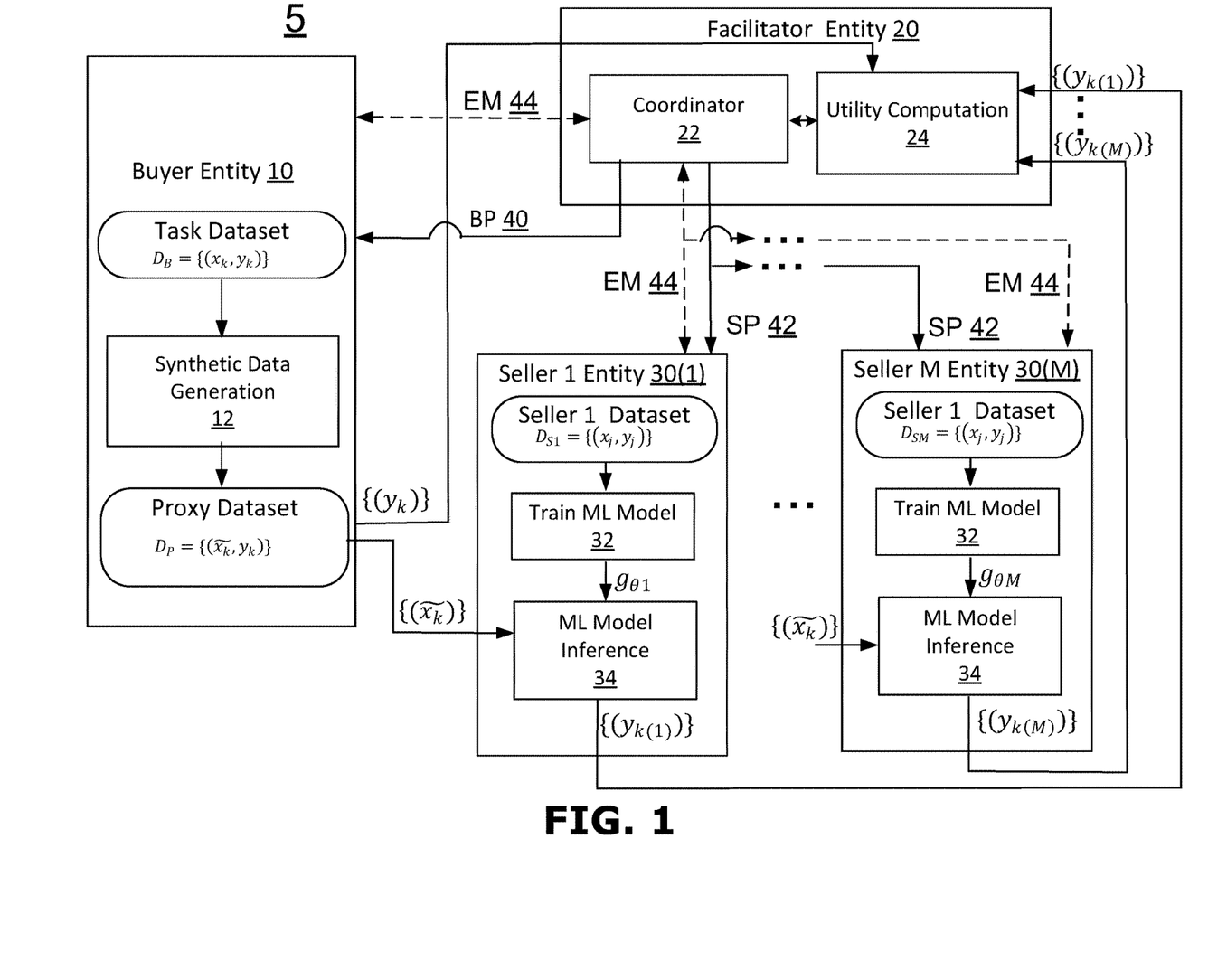
FIG. 1 shows a block diagram of data valuation and exchange network that includes a buyer entity, facilitator entity and a plurality of seller entities that collectively facilitate secure and private evaluation and exchange of data, according to example embodiments.

FIG. 1 illustrates a data valuation and exchange network 5 (hereafter network 5) that includes a collection of participating entities 10, 20, 30(1) to 30(M) to which methods, systems, and computer readable mediums that are disclosed herein can be applied. As used herein, "entity" can refer to a set of resources that is associated with or under the control of an enterprise. The set of resources can, for example, include one or more computer systems (including computer hardware, computer software, databases and datasets) that are part of or communicate with an enterprise network, including through a virtual private network.

The entities of network 5 can include a first entity 10 (hereinafter referred as "buyer entity" 10); at least one second entity 30(i) (hereinafter referred to as "seller entity" 30(i); and a third entity 20 (hereinafter referred to as "facilitator entity" 20). Buyer entity 10 can include one or more computer systems associated with or controlled by a buyer that controls a task dataset $D_B$. The buyer wants to acquire additional data that can be used to train an effective ML model to perform the same ML model prediction task that is represented in the task dataset $D_B$. Using the acquired data, buyer may use it to train a machine learning model from scratch or improve performance of an existing machine learning model using a bigger and a more diverse dataset. In this regard, the buyer desires to evaluate one or more seller datasets S: $=\{D_{Si}, i=[1: M]\}$ that are available from respective seller entities 30(1) to 30(M). Each seller entity 30(i) may for example include one or more computer systems associated with or controlled by a seller i that desires to sell a respective seller dataset $D_{Si}$. For the sake of simplicity, in the environment of FIG. 1, each discrete seller entity 30(i) includes a respective seller dataset $D_{Si}$. However, in some examples, a single seller entity 30(i) may include multiple respective seller datasets that can each be individually evaluated using the systems and methods described herein.

Facilitator entity 20 may for example include one or more computer systems associated with or controlled by a facilitator that manages a service platform for intermediating between buyers and sellers. In example embodiments, each of the networked entities 10, 20, 30(1) to 30(M) includes a respective controlled access computer system for storing data and performing the respective processes that are described below. Controlled access means that access to the enterprise resources is limited to authorized parties or devices that meet pre-defined access criteria. Accordingly, in an example embodiment, each of the networked entities 10, 20, 30(1) to 30(M) are respectively deployed in their own secure and physically separated environment and exchange information about datasets only when mandated by the evaluation process protocols disclosed herein.

In the illustrated example, buyer task dataset $D_B$ is a stored resource of buyer entity 10. In the illustrative example, each task data sample $x_k$ can be an image and the trusted label $y_k$ can identify a class label for the image from a set of possible class labels.

A process flow of interactions between the entities of FIG. 1 and actions performed at each of the entities will now be described. As a preliminary step, buyer entity 10 (and other buyer entities) and multiple seller entities (including seller entities 30(1) to 30(M) and possibly other seller entities) can register with and submit respective metadata to a coordinator module 22 of the facilitator entity 20. In the case of buyer entity 10, buyer metadata can include definitions and descriptions of the task dataset $D_B$, desired features of a seller dataset, and an intended ML task. This can include information like ordered set of class labels, class frequency distribution, loss functions, evaluation metrics, task definition, and required dataset size, among other things. In the case of each seller entity, seller metadata can include definitions and descriptions of the seller dataset $D_s$ including information defining possible tasks, class labels, dataset size, and dataset distribution information among other things. The facilitator entity 20 can perform searches and select a subset of seller datasets (e.g., seller datasets $D_{S1}$ to $D_{SM}$) which best match the buyer entity requirements based on the buyer metadata. For example, class labels, task definition, volume and other possible measurable constraints can be used to select the seller datasets Using, for example, a k-nearest type of matching. The exchanged metadata does not include actual data samples from the task dataset or seller datasets, but rather only non-sensitive descriptive information about tasks and datasets as required to enable the facilitator entity 20 to match potential seller datasets $D_S$ to the buyer entity 10.

In an example embodiment, in response to receiving an inquiry from buyer entity 10 (which can include the buyer metadata) the coordinator module 22 of the facilitator entity 20 can initiate a data valuation process that includes a first step of sending a buyer-side protocol (BP) 40 for the evaluation process to the buyer entity 10 and a seller-side protocol (SP) 42 to the participating seller entities 30(i). In the case of seller entities, the SP 42 defines a model training and evaluation process, which includes a specific ML model architecture g and a training algorithm (denoted hereafter as "learn") that each seller entity 30(i) uses to train respective machine learning models $g_{ei}$ on their local datasets $D_{Si}$. In the case of the buyer entity 10, the BP 40 can specify a detailed algorithm for proxy data synthesis, which also includes a model training and evaluation process, for instance, model architecture g and training algorithm learn and other parameters. The defined model architecture and training algorithms can be selected for an evaluation process based on the intended prediction task. In some examples, instead of the facilitator entity 30 selecting the defined model architecture and training algorithm, another entity, for example the buyer entity 10, can select the defined model architecture g and training algorithm learn for an evaluation process and convey it to the facilitator in an additional step.

For a particular dataset trading instance, the same model architecture g and training algorithm learn be specified in both SP 42 and BP 40 for use by the seller entities 30(i) and the buyer entity 10. This is due to two reasons. First, the proxy data synthesis is conditioned on model architecture and learning algorithm, hence, for optimal performance, the seller models gel are trained using the same model architecture g and learning algorithm learn used in the synthesis of proxy datasets at the buyer side. Second, training all the seller models $g_{ei}$ under same conditions (g and learn) ensures fair comparison of the respective datasets and rules out any undue advantages of one seller over the others.

The model architecture g and algorithm learn includes definitive steps to train a particular machine leaning model. For example, g may be a two-layer DNN with 50 hidden units in each layer connected using relu activations, followed by a final classification layer with C units. The training algorithm learn contains comprehensive code for training machine learning models like randomly initializing the weights of the model instantiated as per the architecture g, code for iteratively updating the weights, using, for example, a gradient based algorithm like Stochastic Gradient Descent, stopping criteria based on validation error or fixed number of epochs, etc.

As will be explained in greater detail below, a buyer entity 10 applies the BP 40 for proxy data synthesis to generate a proxy dataset $D_p$ in which the task data samples $\{(x_k)\}$ included in the original task dataset $D_B$ are replaced with respective synthetic data samples $\{(\widetilde{x}_k)\}$. Each of respective seller entity 30(i) applies the SP 42 to train a respective ML model $g\theta_i$, using its respective seller dataset $D_{si}$. The buyer entity 10 provides the independent variable (i.e., synthetic data samples $\{(\widetilde{x}_k)\}$) of the proxy dataset $D_p$ to each respective seller entity 30(i). Each respective seller entity 30(i) then generates a set of respective label predictions $\{(y_{ki})\}$ for the proxy dataset $D_p$ using its respective ML model $g\theta_i$ (which is trained on its own seller dataset $D_{si}$). Each respective seller entity 30(i) sends its set of respective label predictions $\{(y_{ki})\}$ to facilitator entity 20. Additionally, the buyer entity 10 provides the trusted labels $\{(y_k)\}$, unchanged from the original task dataset $D_B$, to the facilitator entity 20. The facilitator entity 20 then computes a utility for each respective seller entity 30(i) based on a comparison of the trusted labels $\{(y_k)\}$ to corresponding counterparts in the respective label predictions $\{(y_{ki})\}$. These computed utilities can then be used by the entities to determine what seller datasets are useful for the buyer entity machine learning task as well as discovery of a fair monetary value of such datasets for the seller entities.

A consideration in the overall work process of network 5 is generating the proxy dataset $D_p$ in such a manner that the synthetic data samples $\{(\widetilde{x}_k)\}$ optimize competing utility and data security objectives. The utility objective requires that the synthetic data samples $\{(\widetilde{x}_k)\}$ tends to produce the same label predictions as that of the original data points $\{(x_k)\}$ for all seller models $g\theta_i$. Hence, with $g\theta_i((\widetilde{x}_k)) \approx g\theta_i(x_k)$ for all k and i, the utility information, computed by the facilitator entity 20, with the synthetic dataset $D_P$ is approximately similar to that of the original dataset $D_B$. The data security objective requires that the synthetic data samples {($\widetilde{x_k}$)} of proxy dataset $D_P$ to be sufficiently different from the original task data samples to render them perceptually unintelligible (for example, in the case of data samples that can be observed by humans). Since the individual synthetic data samples are perceptually unintelligible (e.g., they look like random noise), the data-item IP and privacy of individual data items is protected. Additionally, in order to protect statistical IP, the security goal requires to prevent ML models trained with architectures other than the evaluation process architecture g to make accurate label predictions for them, and, finally to prevent machine learning models trained using the proxy dataset $D_P$ to be effective for inference on the original dataset $D_B$. Due to being ineffective for statistical analysis like training and inference, statistical IP is also protected.

As indicated in FIG. 1, buyer entity 10 includes a synthetic data generation module 12 that is configured to generate the proxy dataset $D_p$ with a goal of optimizing these competing utility and data security objectives. Synthetic data generation module 12 applies a synthetic data generation process that is based on the BP 40 sent by the facilitator entity 20, to generate a proxy dataset $D_p$.

Figure 2:
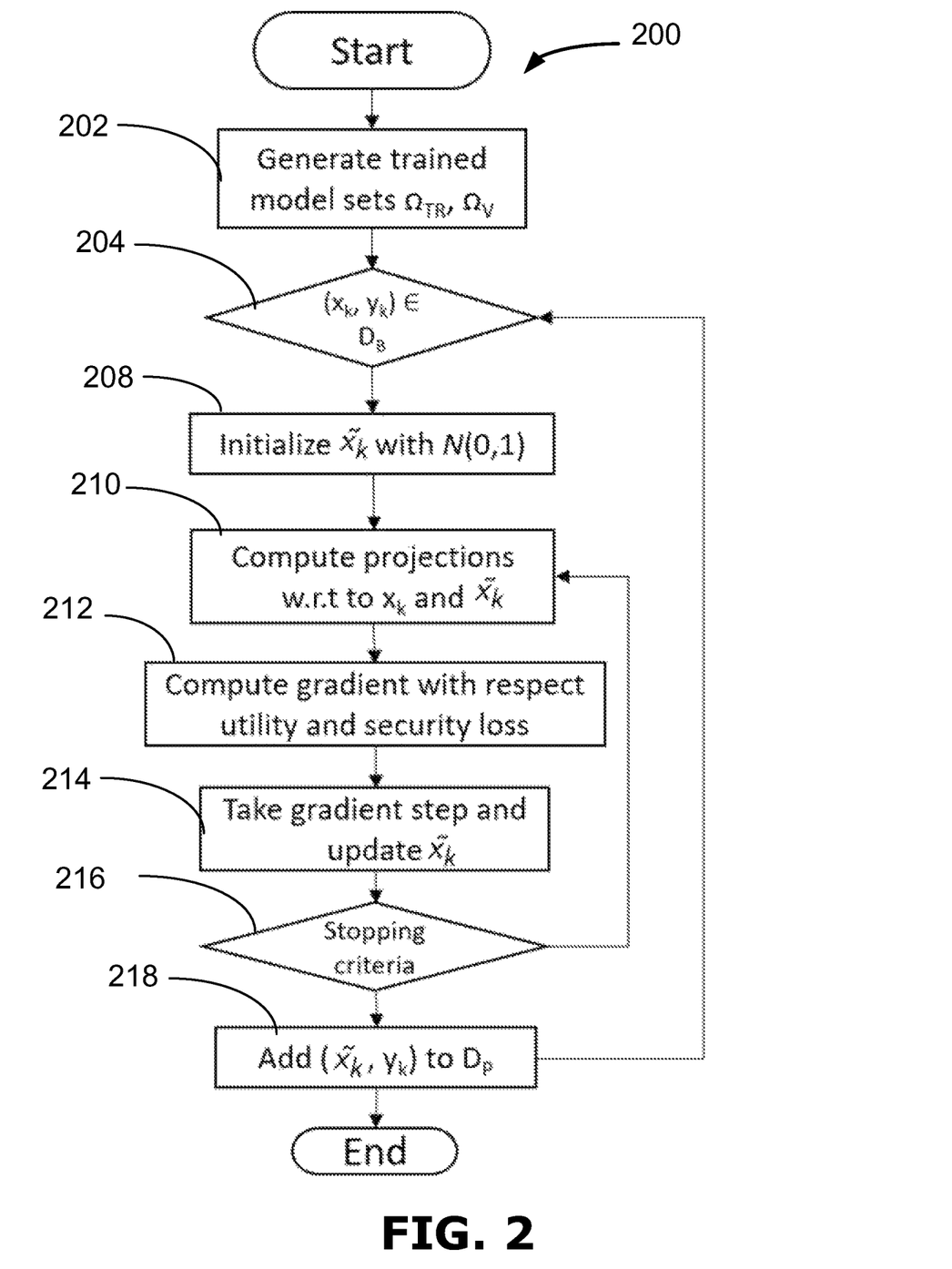
FIG. 2 is a flow diagram illustrating an example of a process performed by a synthetic data generation operation of the buyer entity of FIG. 1.

An example of a synthetic data generation process 200 performed by synthetic data generation module 12 will be described with reference to FIG. 2, which shows a block diagram overview of the synthetic data generation process 200, and FIG. 3, which shows a pseudocode outline ("Algorithm 1") of the synthetic data generation process 200.

Notations relevant to the description of synthetic data generation process 200 include:

- $\Omega_{TR}$, $\Omega_V$—training set of ML models, and evaluation set of ML models, respectively;
- $D_B$, $D_P$—original task dataset and synthesized proxy dataset, respectively;
- $(x_k, y_k)$, $(\widetilde{x_k}, y_k)$—original and synthesized $k^{th}$ data points, respectively; and
- $f_\theta$—trained ML model with parameters $\theta$, selected from training set $\Omega_{TR}$ of ML models.

The inputs to synthetic data generation process 200 include: (i) the buyer task dataset $D_B$ (which can be stored by buyer entity 10); and (ii) BP 40 (received from facilitator entity 20) that identifies the model architecture "g" and training algorithm learn for training and evaluating ML models and other parameters to be applied by the synthetic data generation process 200.

As indicated in Block 202 (lines 2,3 in Algorithm 1), the task dataset $D_B$ is used to learn a training set of ML models $\Omega_{TR}$, and a validation set of ML models $\Omega_V$ with random initialization, using the model architecture and training algorithm specified in the BP 40.

To provide context for ML model sets $\Omega_{TR}$, $\Omega_V$, the network 5 does not allow either the buyer entity 10 or the facilitator entity 20 to have access to either the seller datasets $D_s$ or the trained seller ML models $g\theta_i$ (which can embed high-value intellectual property and sensitive private information about the sellers dataset $D_s$) during the synthetic data generation process. Accordingly, the synthetic data generation process 200 relies on simulated access to a distribution of ML models $\Omega_\theta$ from which the seller ML models $g\theta_i$ are assumed to be sampled. Using this distributional access, the synthetic data generation process uses statistical optimization to synthesize data points which can satisfy the utility and security goal for all members of the distribution $\Omega_\theta$. In practice, the buyer entity uses a finite sample from the distribution $\Omega_{TR}$ for the statistical optimisation. In order to generate the finite sample, it learns a training set of ML models $\Omega_{TR}$ by using the buyer task dataset $D_B$ with random noise and random initialization to emulate seller ML models $g\theta_i$ of varying ground truth utility with respect to the buyer's ML task. Buyer entity 10 learns validation set of ML models $\Omega_V$ in a similar manner to verify how well the synthesized data point generalise for models outside the training set $\Omega_{TR}$. As explained below, trained sets of ML models $\Omega_{Tr}$, $\Omega_V$ are used during further steps in the synthetic data generation process 200 for synthetic data generation.

As indicated in decision block 204, the operations of blocks 208 to 218 are repeated until a respective synthetic data point $(\widetilde{x_k}, y_k)$ is added to the proxy dataset $D_P$ for each $(x_k, y_k)$ data point included in the original buyer task dataset $D_B$. As indicated at block 208, for each data point $(x_k, y_k) \in D_B$, the synthetic data sample $\widetilde{x_k}$ of the data point $(\widetilde{x_k}, y_k)$ is initialized by sampling from a random distribution $N(0,1)$.

As indicated in blocks 210 to 216, a solution to an optimization problem is then computed by performing a set of iterations to synthesize a data sample $\widetilde{x_k}$ until either a stop criteria is reached, which can be achieved by either meeting a loss-stopping criteria or reaching a defined number (T) of iterations. Each iteration includes:

(i) block 210—randomly sample the training ML model set $\Omega_{TR}$ to select a subset of training ML models $\{(f_\theta)\}$, and use each of training ML models in the subset $\{(f_\theta)\}$ to generate a respective projection (e.g., a label prediction) for the synthetic data sample $x_k$ and for the real task data sample $x_k$;

(ii) block 212—compute a gradient that combines (a) a utility gradient based on a loss that corresponds to the aggregate differences between the final-layer activations for the synthetic data sample $\widetilde{x_k}$ relative to the final-layer activations for the real task data sample $x_k$; and (b) a security gradient based on a difference between the synthetic data sample $\widetilde{x_k}$ and the real task data sample $x_k$ in the pixel space, for example, as per the following equation:

$$g_k = \frac{1}{|\Omega_{Tr}|} \sum_{n=1}^{|\Omega_{Tr}|} \left[ \frac{\partial \mathcal{L}(f_{\theta_n}(x_k), f_{\theta_n}(\widetilde{x}_k))}{\partial f_{\theta_n}(\widetilde{x}_k)} \cdot \frac{\partial f_{\theta_n}(\widetilde{x}_k)}{\partial \widetilde{x}_k} \right] - \frac{\partial \mathcal{D}(x_k, \widetilde{x}_k)}{\partial \widetilde{x}_k}$$

where the first term is the utility gradient and the second term is the security gradient (the optimization objective for gradient is discussed in greater detail below);

(iii) block 214—update the synthetic data sample $\widetilde{x_k}$ based on the computed gradient;

(iv) block 216—determine if stopping criteria (i.e., loss-stopping criteria or maximum number of iterations) has been reached in respect of the synthetic data sample $\widetilde{x_k}$. In example embodiments, the loss-stopping criteria is computed using an unseen set of models $\Omega_V$ which have not been observed during the optimisation (computation of gradients and updates). Specifically, the loss-stopping criteria calculated based on an analysis of the predicted labels generated by the set of validation models $\Omega_V$ for the recently updated synthetic data sample $\widetilde{x_k}$ and the task sample $x_k$ (see Algorithm 1 lines 12, 13, 14 of FIG. 3). In some example embodiments, the loss-stopping criteria can be reached when further iterations do not result in a defined threshold improvement to a loss computed based on a defined loss objective.

The gradients are evaluated based on optimizing the following empirical risk minimisation loss objective:

$$\arg\min_{\tilde{x}_k} \underbrace{\frac{1}{|\Omega_{Tr}|} \sum_{n=1}^{|\Omega_{Tr}|} \left[ \mathcal{L}(f_{\theta_n}(x_k), f_{\theta_n}(\tilde{x}_k)) \right]}_{\text{utility loss}} - \underbrace{\lambda \mathcal{D}(x_k, \tilde{x}_k)}_{\text{security loss (regularisation)}}$$

where the first term represents utility loss that seeks to minimize differences between a sample ML model final-layer activations for the synthetic and true data samples, and the second term represents a security loss that seeks to maximize a difference between the synthetic and true data samples in the pixel space. For each $x_k, y_k \in D_B$, the first term of the above equation strives to synthesize a data point $\tilde{x}_k$, , $y_k \in D_P$, which produces approximately the same output class distribution $g\theta_i(\tilde{x}_k) \approx g\theta_i(x_k)$ for all i. Consequently, if the entropy of $g\theta_i(x_k)$, for all i, is sufficiently low, which is expected from a well-trained and confident model, the argmax prediction and the final verdict will be the same. Hence, intuitively, the aggregated utility (across all k) of $D_p$ and $D_B$ can expected to be approximately similar. On the other hand, the data-item level pixel-wise distance (in the case of image samples) may not necessarily ensure perceptual incompressibility, however, due to the subjective nature of $g\theta_i$s, which are chosen to be over-parameterized deep neural networks, the above equation has infinite solutions, majority of which are not in the manifold of real images. This is simply because of the fact that the size of real image manifold is extremely small in the space of all real images. Hence, the pixel-wise distance term is enough to guide the optimisation away from the small probability of ending up in the manifold of real image solutions. Consequently, if the images in $\{\tilde{x}_k\}$ are not in the real manifold, the resulting synthesized images are perceptually incomprehensible. Due to perceptually incomprehensible images, we can safely ensure protection in terms of privacy, data-item level (image) IP and dataset-level (statistical) IP.

As indicated in block 218, once the stopping criteria is achieved, the proxy dataset $D_P$ is updated to include the newly learned synthetic data sample $\tilde{x}_k$ as a data point ($\tilde{x}_k$, , $y_k$). The blocks 208 to 218 are then repeated until proxy dataset $D_P$ is fully synthesized.

As previously indicated, once the proxy dataset $D_p$ has been fully synthesized, the set of synthetic data samples $\{(\tilde{x}_k)\}$ (also referred to as the independent variables) can be provided (without any corresponding labels) through a communications channel (which can be a secure channel) to each of the seller entities 30(1) to (M). The trusted labels $\{(y_k)\}$ can be provided (without data samples) through a communications channel (which can be a secure channel) to the facilitator entity 20.

As indicated in FIG. 1, seller entities 30(1) to (M) each include a respective ML model training module 32 and a trained ML model inference module 34. A process performed at an example $i^{th}$ seller entity 30(i) will now be described with respect to FIG. 4, according to an example of the disclosure. As noted above, seller entity 30(i) is provided with a SP 42 by facilitator entity 20. The SP 42 defines an ML model architecture g and training algorithm learn (block 402). Seller entity 30(i) applies the SP 42 using its ML model train module 32 and its own local seller dataset $D_{si}$ to train a ML model on its dataset $D_{Si}$, resulting in trained ML model $g\theta_i$ (block 404). The seller entity 30(i) receives the proxy dataset $D_p$ (only the independent variables) from buyer entity 10 (block 406). Seller entity 30(i) applies the trained ML model $g\theta_i$ to the proxy dataset $D_p$ using trained ML model inference module 34 to output a set of seller predictions $\{(y_{k(i)})\}$ for the set of synthetic data samples $\{(\tilde{x}_k)\}$ (block 408). The set of seller predictions $\{(y_{k(i)})\}$ are then sent to the facilitator entity 30 (block 410).

Figure 4:
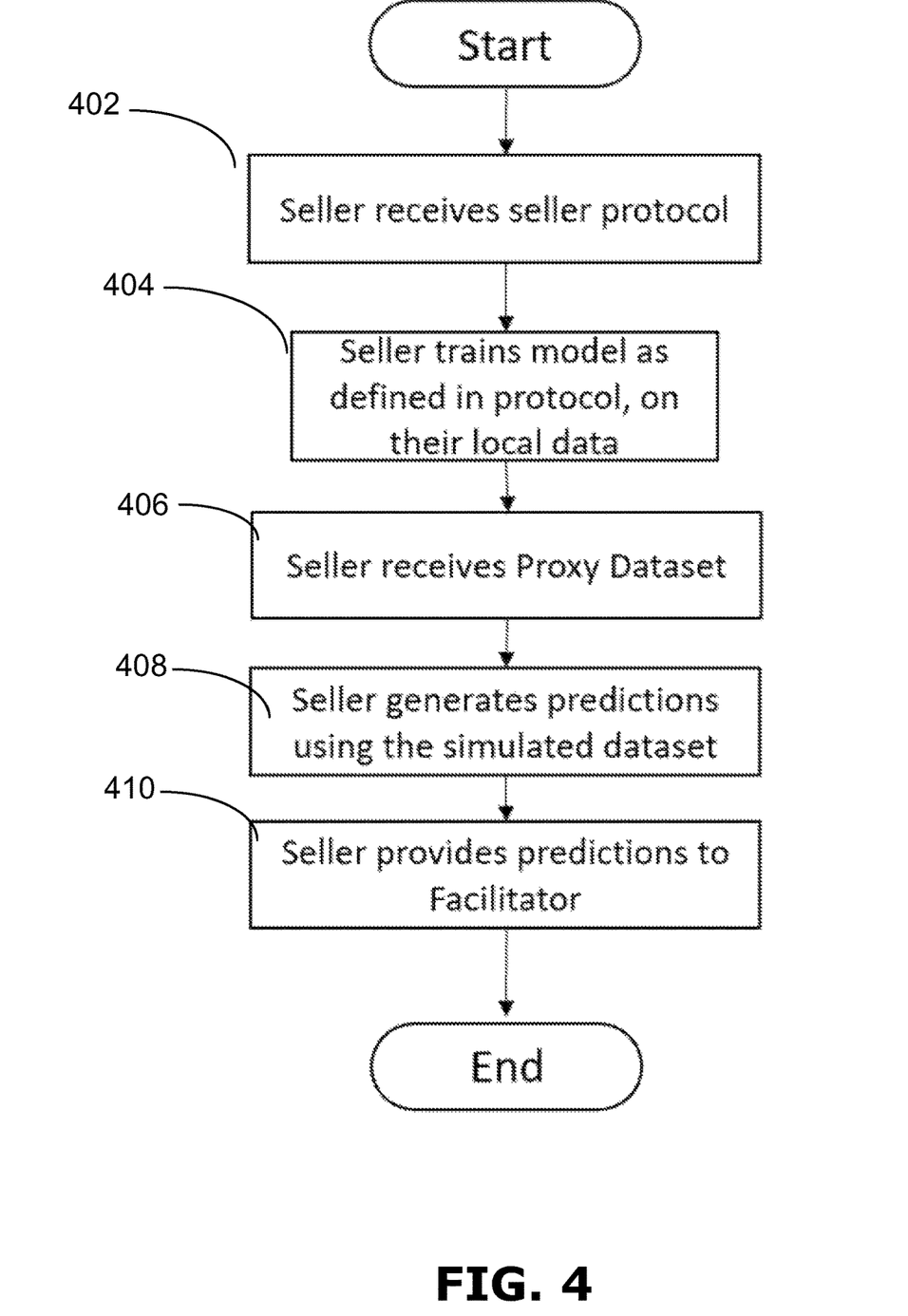
FIG. 4 is flow diagram illustrating an example of a process performed by a seller entity of FIG. 1.

Since the set of proxy data points $\{(\tilde{x}_k)\}$ are generated using the utility and security goals in the statistical optimization, the generated predictions $\{(y_{k(i)})\}$ should be close to that of the original buyer task dataset $D_B$. However, the points $\{(\tilde{x}_k)\}$ gives security (intellectual property protection and privacy) which the original task dataset $D_B$ cannot provide.

Figure 5:
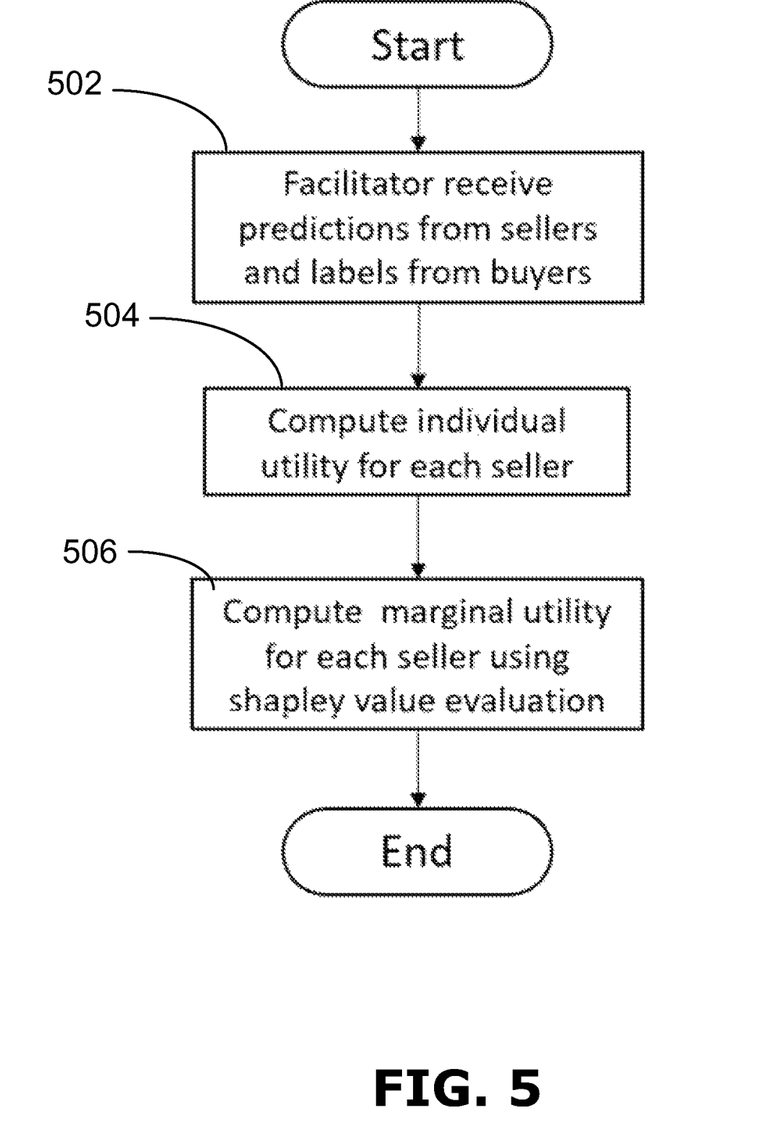
FIG. 5 is flow diagram illustrating an example of a process performed by a facilitator entity of FIG. 1.

As indicated in FIG. 1, facilitator entity 20 includes a utility computation module 24. A process performed by the utility computation module 24 will now be described with respect to FIG. 5, according to an example of the disclosure. Facilitator entity 30 receives the set of ground truth task labels $\{(y_k)\}$ from the buyer entity 10, and facilitator entity 20 receives a respective sets of seller predictions $\{(y_{k(i)})\} = \{g\theta_i(\tilde{x}_k)\}$ from each of the M participating seller entities 30(i) (block 502). In an example embodiment, utility computation module 24 computes a respective individual utility ($U_i$) as an evaluation metric for each of the respective sets of seller predictions $\{(y_{k(i)})\}$ (and hence their corresponding seller datasets $D_{si}$) (block 504). The individual utility $U_i$ can be computed using a utility function that is based on a comparison of the seller predictions $\{(y_{k(i)})\}$ to the ground truth task labels $\{(y_k)\}$. In case of classification task, this can be classification accuracy. The higher the accuracy, the higher the individual utility $U_i$ for the seller dataset $D_{si}$. By way of example, a generic representation of a possible individual utility function is:

$$U_i = \frac{1}{|D_p|} \sum_{k=1}^{|D_p|} \mathcal{U}(g_{\theta i}, (x_k), y_k)$$

Where $\mathcal{U}$ can be any number of standard functions for assigning a comparison value to two variables like classification accuracy.

In some examples, in addition to or as an alternative to computing individual utilities $U_i$, the utility computation module 24 can compute a marginal utility contribution of an individual seller dataset $D_{si}$ with respect to all of the other seller datasets (block 506). This can give an indication of how much utility is improved (on average) if the prediction results for an individual seller dataset $D_{si}$ is added to all possible subsets of the prediction results of other individual seller dataset $D_{si}$. A higher marginal utility of a particular seller dataset means that dataset contains distinct information (with respect to other seller datasets) and adds unique independent information with respect to other seller datasets. This unique dataset can be useful for a buyer's target ML task to get relatively hard examples correctly classified. Such an analysis can be performed, for example, by applying Shapley value analysis. By way of example, a generic representation of a possible marginal utility function for the $i^{th}$ seller is:

$$\Phi_i = \frac{1}{|S|} \sum_{s \subseteq S - \{i\}} \frac{1}{\binom{|S|-1}{|s|}} [U(s \cup \{i\}) - U(s)]$$

Where U(s) is the combined best-case utility of all seller predictions in the subset s of all sellers S; U(s u {i}) is the combined best-case utility all seller datasets in the set {s+i}; and S is the set of all M seller datasets being considered by the utility computation module 24. The best-case utility U(s) is computed such that if, for a particular data sample, the prediction is correct for at least one seller in s, that data sample is regarded as correctly classified.

Accordingly, in example embodiments the evaluation metrics output by utility computation module 24 includes an individual utility $U_i$ and a marginal utility $\Phi_i$ score for each of the seller datasets $D_{si}$, i={1, . . . , M}. This information can be used by participating entities to objectively assess the utility and value of the seller datasets. In the illustrated example, coordinator module 22 of the facilitator entity 20 can be configured to intermediate the distribution of the data valuation metrics and provide an escrow service to facilitate payment for and exchange of datasets.

Figure 6:
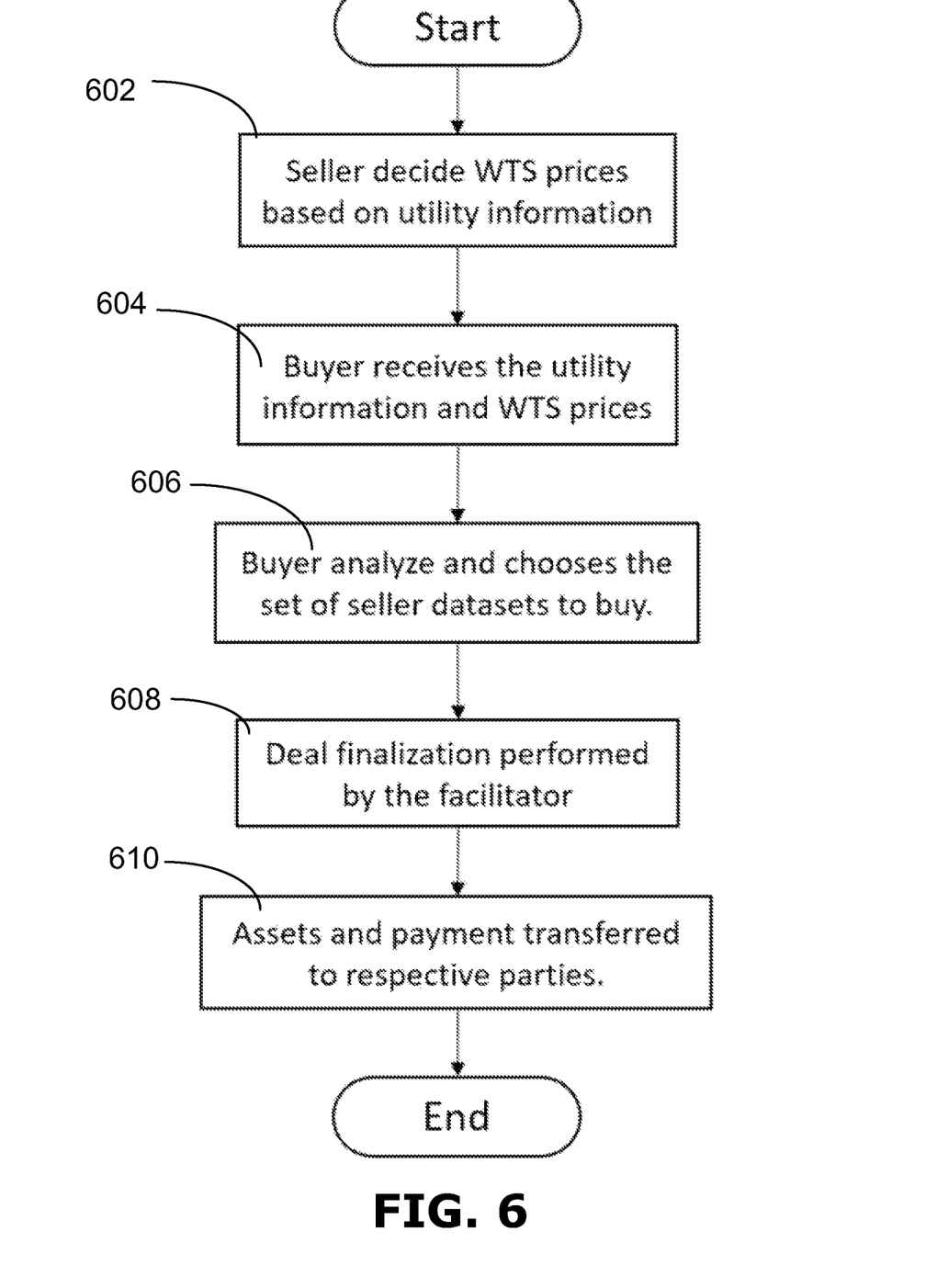
FIG. 6 is flow diagram illustrating an example of a process performed among the entities of FIG. 1.

In this regard, FIG. 6 illustrates a price discovery and deal finalization process that can be performed among the participating entities according to an example embodiment. As indicated at block 602, each seller entity 30(i) can be provided, by the facilitator entity 20, with the evaluation metrics for its own respective seller dataset $D_{si}$. Based on this information, each seller entity 30(i) can set a Willing-To-Sell (WTS) cost for its respective seller dataset $D_{si}$, and provide that information to the facilitator entity 20. The facilitator entity 20 can assemble the WTS data from participating seller entities 30(1) to 30(M) together with the evaluation metrics for the respective seller datasets $D_{s(1)}$ to $D_{S(M)}$ and provide the assembled information to buyer entity 10 (block 604). Buyer entity 10 can analyze the received WTS and seller data valuation metrics and then send an indication (e.g., a buy list) to the facilitator entity 20 identifying the seller datasets $D_s$ that the buyer entity 10 wants to acquire (block 606). The facilitator entity 20 can then initiate a closing protocol between the buyer entity 10 and each seller entity 30(i) that is included in the buy list, which may include additional price negotiation. (block 608). Once agreement is reached, the facilitator entity 20 can facilitate a transfer of assets and payments (block 610) such as: (1.) facilitator entity 20 receives payment in escrow for the dataset $D_{si}$ from the buyer entity 10 and informs the seller entity 30(i) of the received payment; (2.) seller entity 30(i) sends dataset $D_{si}$ directly to the buyer entity 10 through a secure channel, thereby completing a predetermined transfer requirement; (3.) buyer entity 10 confirms it has received dataset $D_{si}$ by sending acknowledgments to facilitator entity 20 and seller entity 30(i); and (4) facilitator entity 20 transfers payment to seller entity 30(i). The facilitator entity 20 may in some examples deduct a commission fee from the payment as compensation for services.

In the above described evaluation process, the synthetic data generation process 200 in combination with the use of a common ML model architecture g and training algorithm learn for the randomly initialized ML model sets $\Omega_{TR}$, $\Omega_V$ trained by the seller entity 20 and the respective seller ML models $g_{\theta i}$ can provide one or more of the following advantageous features in at least some applications:

(1) The utility metrics computed based on predictions made for the synthetic proxy dataset $D_P$ can be approximately same as if the original dataset $D_B$ was processed by the seller ML models. Thus, in at least some applications, accurate utility information can be obtained with the synthetic proxy dataset $D_P$ without either the seller entities or the facilitator entity ever having access to the actual data samples $\{(x_k)\}$ of the buyer task dataset $D_B$.

(2) For any general ML model, other than one trained with facilitator provided model architecture g and training algorithm learn (for example seller ML models $g_{\theta i}$), utility with the proxy dataset $D_P$ will be much less as these arbitrary models do not fall under the distribution $\Omega_\theta$. This ensures that the proxy dataset $D_P$ cannot be used to do model selection or utility computation in general, hence protecting the statistical inference information about the buyer task dataset $D_B$ that may be embedded in the proxy dataset $D_P$.

(3) ML models $f_\theta$ trained with the proxy datasets $D_P$ will not perform well when applied to the original buyer task dataset $D_B$. In other words, proxy dataset $D_P$ is not effective in training models which perform well on the real dataset, hence protecting the statistical training information.

(4) The data samples of the proxy dataset $D_P$ will be at a high distance (in the pixel space) from the original data samples of the buyer task dataset $D_B$. For example, in the case of image samples, the distance measured in semantic space, using image quality assessment metrics (IQA) like FID, SSID, FSIM, Content Loss, etc., will be high. This means that new dataset images in the proxy dataset will protect the data-item IP and attribute privacy (visual information) of the original images in the buyer task dataset.

Among other features, in various examples, the data valuation and exchange network 5 can enable a secure, private and fair data trading network that can achieve, in at least some application scenarios, one or more of the following properties: (i) Security: the network includes protections against leakage of the proprietary rights (both data-item level and dataset level IP) of the buyer and seller's dataset assets; (ii) Privacy: the network can ensure that buyers and sellers do not lose the privacy of their data items (attribute level privacy of visual images); (iii) Computational efficiency: the overall network can be computationally efficient with regards to utility estimation of seller datasets (no need for computationally inefficient encryption or training exponentially large models for shapely value estimation); (iv) Versatility: the network can be applied in the context of high-dimensional data and work for variety of machine learning models (in contrast to existing solutions, for example differential privacy based approaches); (v) Fairness: the network is fair with respect to sellers capability to solve the buyer task, and enables an accurate estimate of the seller dataset value (performance). Also, utility information can be transparently available to both buyer and sellers for a fair price discovery.

The data synthesis process 200 disclosed herein is configured to extract only relevant information that is required for utility estimation for seller datasets and omit all other information from the original buyer task dataset $D_B$. Data synthesis is treated as an iterative optimization problem. The resulting optimized proxy dataset $D_P$ facilitates both intellectual property and privacy protection.

Regarding security and privacy, the systems and methods disclosed herein assume no trust between sellers, buyers, and the platform. This is addressed in two ways. First, the network 5 provides protection due to limited data accessibility for each party. The buyer entity 10 only sends the sanitized independent variable of the proxy data to seller entities 30(1) to 30(M) for ranking computation based on utility. The platform entity 20 only receives seller entity predictions and ground truth task labels from the buyer entity 10 to compute rankings (individual and marginal utilities). Seller entities 30(1) to 30(M) do not share their respective seller datasets with any other parties. Second, the data synthesis process 200 converts the original buyer task dataset $D_B$ into proxy dataset $D_P$ which provides protection against intellectual property theft and privacy violations by hiding information. The proxy dataset $D_P$ contains only selective information for needed for accurate utility estimation w.r.t seller models and omits other information from the original buyer task dataset, allowing security of intellectual property and privacy. In short, our method restricts potentially malicious sellers to use the proxy dataset $D_P$ for anything other than their own model's utility estimation.

In at least some examples, for example in the case of image data, the data sanitization that is effected by data synthesis process 200 causes image obfuscation allowing attribute level privacy, resulting in images that look like random noise such that an adverse party can't obtain any visually identifiable information (e.g., faces and details of data can be hidden).

Regarding computational efficiency, the disclosed systems and methods do not rely on inefficient encryption or exponential model training. As noted above, the data synthesis process 200 solves an iterative optimization problem. In some examples, the iterative optimization can be further optimized using a one-shot process with a specifically trained neural network.

Regarding versatility, the disclosed systems and methods can be used with standard deep learning pipelines and unstructured datasets like MNIST, CIFAR-10, among other examples. This is in contrast to existing prior art like differentially private generative adversarial networks approaches which has poor performance on high dimensional datasets. Although image classification has been mentioned above, the disclosed systems and methods described herein, including data synthesis process 200, is independent of the underlying learning problem and is easily extendible to other learning problems like object detection, natural language processing, etc.

Regarding fairness, the disclosed systems and methods offer transparency that offers fairness for sellers. First, the optimization used for data synthesis has an explicit term which ensures data utility for seller models is accurate (close to utility with original data). Hence, an accurate estimate of the utility of each seller dataset can be provided. Second, the use Shapley value analysis to compute marginal utility gain for each seller dataset can give an indication of the importance of a particular seller dataset with respect to other seller datasets, which can be very useful in price discovery for sellers. Third, seller dataset utility is computed by the facilitator entity, hence removing the possibility of seller entities lying about their utility. Finally, both the marginal utility gain and individual utility gain is computed for each seller dataset to determine a holistic picture of each seller dataset value to the buyer task. This utility information is shared with both sellers and buyers for a fair and transparent price discovery through negotiations.

Figure 7:
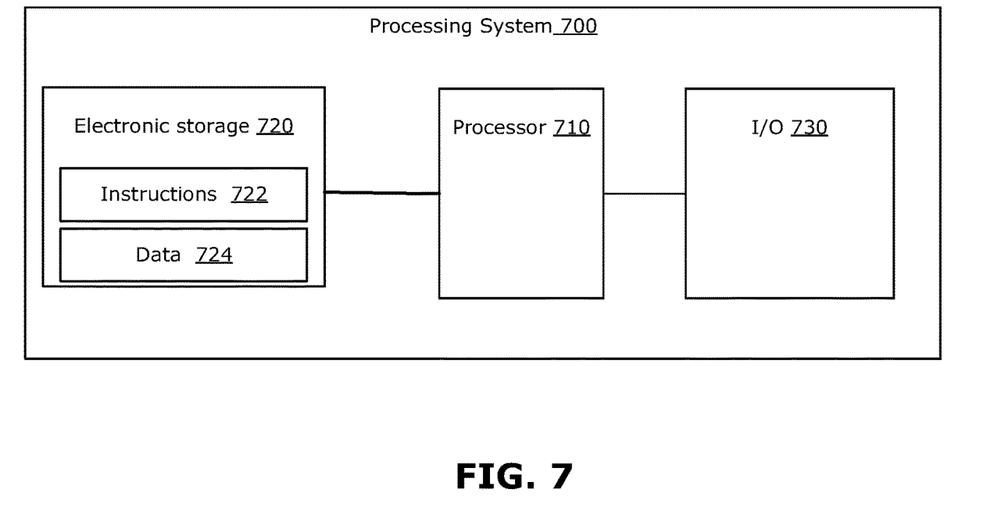
FIG. 7 is a block diagram, of a computer system that can be used to implement the entities of FIG. 1.

FIG. 7 illustrates an example of a processing system 700 that may be used to implement a respective entity (for example a seller entity 10, facilitator entity 20 and/or a seller entity 30(*i*)) in the network 50. The processing system 700 includes one or more processors 710. The one or more processors 710 may include a central processing unit (CPU), a graphical processing unit (GPU), a tensor processing unit (TPU), a neural processing unit (NPU), a digital signal processor, and/or another computational element. The processor(s) 710 are coupled to an electronic storage(s) 720 and to one or more input and output (I/O) interfaces or devices 730 such as network interfaces, user output devices such as displays, user input devices such as touchscreens, and so on.

The electronic storage 720 may include any suitable volatile and/or non-volatile storage and retrieval device(s), including for example flash memory, random access memory (RAM), read only memory (ROM), hard disk, optical disc, subscriber identity module (SIM) card, memory stick, secure digital (SD) memory card, and other state storage devices. In the example of FIG. 7, the electronic storage 720 of the processing system 700 stores instructions 722 (executable by the processor(s) 710) and supporting data 724 for implementing one or more or the various modules described above.

As used in this disclosure, a "module" can refer to a combination of a hardware processing circuit (e.g., the one or more processors 710) and machine-readable instructions (software and/or firmware) executable on the hardware processing circuit. In some examples, module can refer to a hardware processing circuit that has been configured to perform a specific function.

As used herein, the term "within" when used in the context of a range or boundary is inclusive of the values that define the outer range or boundary and all intermediate values between such values. For example, "within 1 to 10" includes the values 1 and 10 and all values there between. As used herein, statements that a second item (e.g., a signal, value, scalar, vector, matrix, calculation, or bit sequence) is "based on" a first item can mean that characteristics of the second item are affected or determined at least in part by characteristics of the first item. The first item can be considered an input to an operation or calculation, or a series of operations or calculations that produces the second item as an output that is not independent from the first item. As used herein, the terms "comprising", "comprises", "including" and "includes" are inclusive terms and do not exclude other elements or components that are not listed. In the present disclosure, use of the term "a," "an", or "the" is intended to include the plural forms as well, unless the context clearly indicates otherwise.

Although the present disclosure describes methods and processes with operations in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The contents of all publications referenced in this disclosure are incorporated by reference.

The invention claimed is:

1. A method for preserving data security and privacy during data valuation, the method being performed by a first entity in communication with a second entity and a third entity, the method comprising:
   generating, by the first entity, a set of synthetic data samples that represent a corresponding set of original data samples, wherein the set of synthetic data samples is generated based on a utility objective and a data security objective by:
      using multiple training machine learning (ML) models to generate a first set of outputs from the set of original data samples, wherein the multiple training ML models are obtained by training each of the multiple training ML models using a respective randomized version of the set of original data samples, and each of the multiple training ML models is trained based on a common model architecture and training algorithm as used to train a ML model at the second entity;
      using the multiple training ML models to generate a second set of outputs from the set of synthetic data samples;
      updating the set of synthetic data samples based on minimizing a normalized sum of prediction differences representing a difference between the first set of outputs and the second set of outputs to satisfy the utility objective and also based on maximizing a sample distance representing a distance between the set of synthetic data samples and the set of original data samples in a sample space to satisfy the data security objective;
   sending, by the first entity, the set of synthetic data samples for use by the second entity to generate a set of second entity predictions for the set of synthetic data samples using the ML model at the second entity that has been trained using a second entity dataset;
   sending, by the first entity, for the third entity, a set of trusted labels corresponding to the set of original data samples; and
   receiving, by the first entity, from the third entity, valuation information for the second entity dataset that is based on a comparison by the third entity of the set of trusted labels and the set of second entity predictions.

2. The method of claim 1 further comprising:
   receiving, by the first entity, the second entity dataset from the second entity upon completion by the first entity of a predetermined transfer requirement.

3. The method of claim 1 wherein the first entity, second entity, and third entity each comprise a respective controlled access computer system and (i) neither the second entity or the third entity have access to the set of original data samples, (ii) the second entity does not have access to the set of trusted labels, and (iii) the first entity does not have access to the second entity dataset prior to the completion by the first entity of the predetermined transfer requirement.

4. The method of claim 1, wherein the second entity is one of a plurality of second entities, and
   sending, by the first entity, the set of synthetic data samples comprises sending the set of synthetic data samples for use by each of the plurality of second entities to generate a respective set of second entity predictions for the set of synthetic data samples using a respective trained ML model that has been trained using a respective second entity dataset that is unique to the second entity, and
   receiving, by the first entity, from the third entity, valuation information comprises receiving, by the first entity, valuation information from the third entity for each of the respective second entity datasets.

5. The method of claim 4 wherein generating, by the first entity, the set of synthetic data samples comprises synthesizing a respective data sample for each original data sample based on both the utility objective that enables consistent valuation information to be generated by the third entity for each of the respective second entity datasets and the security objective that differentiates the synthetic data sample from the original data sample.

6. The method of claim 1 wherein generating, by the first entity, the set of synthetic data samples further comprises:
   synthesizing, for each of the original data samples, the respective synthetic data sample by:
      randomly initializing the synthetic data sample;
      (a) using a plurality of the multiple training ML models to generate respective model outputs for both the synthetic data sample and the original data sample;
      (b) updating the synthetic data sample based on: (i) a first gradient computed by the first entity based on the normalized sum of prediction differences between the respective model outputs for the synthetic data sample and the respective model outputs for the original data sample across the multiple training ML models, and (ii) a second gradient computed by the first entity based on the sample distance between the synthetic data sample and the original data sample; and
      (c) repeating (a) and (b) with an objective of minimizing the prediction difference and maximizing the sample distance, until a defined completion criteria is achieved.

7. The method of claim 6 wherein the original data samples are image samples, the sample space is a pixel space, and the respective model outputs are final layer activations.

8. The method of claim 1, wherein the second entity is one of a plurality of second entities that each generate a respective set of second entity predictions for the set of synthetic data samples using a respective trained ML model that has been trained using a respective second entity dataset that is unique to the second entity, the method comprising:
   receiving, by the third entity, the set of trusted labels from the first entity;
   receiving, by the third entity, the respective sets of second entity predictions generated by each of the plurality of second entities;

computing, by the third entity, the valuation information for each of the respective second entity datasets, sending, by the third entity, for the first entity, the valuation information for each of the respective second entity datasets, and sending by the third entity, for each second entity in the plurality of second entities, the valuation information for the respective second entity dataset of the second entity.

9. The method of claim 8 wherein the valuation information for each respective second entity dataset comprises: an individual utility value that is based on an individual comparison of the set of trusted labels and the set of second entity predictions generated for the second entity, and a marginal utility value that is based on a marginal increase in utility of the respective second entity predictions compared to predictions that includes a plurality of the second entity predictions.

10. The method of claim 8 comprising sending to each second entity in the plurality of second entities an indication of the common model architecture and training algorithm for application by the second entity for training its respective ML model.

11. The method of claim 1, comprising, receiving by the second entity, an indication of the common model architecture and training algorithm for application by the second entity for training the respective ML model.

12. A first entity in communication with a second entity and a third entity, the first entity comprising one or more processors and a memory storing executable instructions that, when executed by the one or more processors configure the first entity to:

generate a set of synthetic data samples that represent a corresponding set of original data samples, wherein the set of synthetic data samples is generated based on a utility objective and a data security objective by:

using multiple training machine learning (ML) models using to generate a first set of outputs from the set of original data samples, wherein the multiple training ML models are obtained by training each of the multiple training ML models using a respective randomized version of the set of original data samples, and each of the multiple training ML models is trained based on a common model architecture and training algorithm as used to train a ML model at the second entity;

using the multiple training ML models to generate a second set of outputs from the set of synthetic data samples;

updating the set of synthetic data samples based on minimizing a normalized sum of prediction differences representing a difference between the first set of outputs and the second set of outputs to satisfy the utility objective and also based on maximizing a sample distance representing a distance between the set of synthetic data samples and the set of original data samples in a sample space to satisfy the data security objective;

send the set of synthetic data samples for the second entity to enable the second entity to generate a set of second entity predictions for the set of synthetic data samples using the ML model at the second entity that has been trained using a second entity dataset;

send, for the third entity, a set of trusted labels corresponding to the set of original data samples; and receive, from the third entity, valuation information for the second entity dataset that is based on a comparison by the third entity of the set of trusted labels and the set of second entity predictions.

13. The first entity of claim 12 wherein the first entity is configured to generate the set of synthetic data samples by synthesizing a respective data sample for each original data sample based on both the utility objective that enables consistent valuation information to be generated by the third entity for each of the respective second entity datasets and the security objective that protects the original data sample from being replicated based on the synthetic data sample.

14. The first entity of claim 12 wherein the first entity is configured to generate the set of synthetic data samples further by:

synthesizing, for each of the original data samples, the respective synthetic data sample by:

randomly initializing the synthetic data sample;

a) using a plurality of the multiple training ML models to generate respective model outputs for both the synthetic data sample and the original data sample;

(b) updating the synthetic data sample based on: (i) a first gradient computed by the first entity based on the normalized sum of prediction differences between the respective model outputs for the synthetic data sample and the respective model outputs for the original data sample across the multiple training ML models, and (ii) a second gradient computed by the first entity based on the sample distance between the synthetic data sample and the original data sample in the sample space; and (c) repeating (a) and (b) with an objective of minimizing the prediction difference and maximizing the sample distance, until a defined completion criteria is achieved.

15. The first entity of claim 14 wherein the original data samples are image samples, the sample space is a pixel space, and the respective model outputs are final layer activations.

16. The first entity of claim 12 in association with the third entity, the third entity comprising one or more processors and a memory storing executable instructions that, when executed by the one or more processors configure the third entity to:

receive the set of trusted labels from the first entity;

receive respective sets of second entity predictions generated by each of a plurality of the second entities that each have a respective second entity dataset;

compute the valuation information for each of the respective second entity datasets, send, for the first entity, the valuation information for each of the respective second entity datasets, and send, for each second entity in the plurality of second entities, the valuation information for the respective second entity dataset of the second entity.

17. A non-transitory computer-readable medium storing instructions which, when executed by execution by a processing system, cause the processing system to perform a method for preserving data security and privacy during data valuation, the method being performed by a first entity in communication with a second entity and a third entity, the method comprising:

generating, by the first entity, a set of synthetic data samples that represent a corresponding set of original data samples, wherein the set of synthetic data samples is generated based on a utility objective and a data security objective by:

using multiple training machine learning (ML) models to generate a first set of outputs from the set of original data samples, wherein the multiple training ML models are obtained by training each of the multiple training ML models using a respective randomized version of the set of original data samples, and each of the multiple training ML models is trained based on a common model architecture and training algorithm as used to train a ML model at the second entity;

using the multiple training ML models to generate a second set of outputs from the set of synthetic data samples updating the set of synthetic data samples based on minimizing a normalized sum of prediction differences representing a difference between the first set of outputs and the second set of outputs to satisfy the utility objective and also based on maximizing a sample distance representing a distance between the set of synthetic data samples and the set of original data samples in a sample space to satisfy the data security objective;

sending, by the first entity, the set of synthetic data samples for use by the second entity to generate a set of second entity predictions for the set of synthetic data samples using the ML model at the second entity that has been trained using a second entity dataset;

sending, by the first entity, for the third entity, a set of trusted labels corresponding to the set of original data samples; and receiving, by the first entity, from the third entity, valuation information for the second entity dataset that is based on a comparison by the third entity of the set of trusted labels and the set of second entity predictions.

18. The non-transitory computer-readable medium of claim 17, wherein the second entity is one of a plurality of second entities, and sending, by the first entity, the set of synthetic data samples comprises sending the set of synthetic data samples for use by each of the plurality of second entities to generate a respective set of second entity predictions for the set of synthetic data samples using a respective trained ML model that has been trained using a respective second entity dataset that is unique to the second entity, and receiving, by the first entity, from the third entity, valuation information comprises receiving, by the first entity, valuation information from the third entity for each of the respective second entity datasets.

19. The non-transitory computer-readable medium of claim 17, wherein generating, by the first entity, the set of synthetic data samples further comprises:

synthesizing, for each of the original data samples, the respective synthetic data sample by:
randomly initializing the synthetic data sample;
(a) using a plurality of the multiple training ML models to generate respective model outputs for both the synthetic data sample and the original data sample;
(b) updating the synthetic data sample based on: (i) a first gradient computed by the first entity based on the normalized sum of prediction differences between the respective model outputs for the synthetic data sample and the respective model outputs for the original data sample across the multiple training ML models, and (ii) a second gradient computed by the first entity based on the sample distance between the synthetic data sample and the original data sample; and
(c) repeating (a) and (b) with an objective of minimizing the prediction difference and maximizing the sample distance, until a defined completion criteria is achieved.

20. The non-transitory computer-readable medium of claim 19, wherein the original data samples are image samples, the sample space is a pixel space, and the respective model outputs are final layer activations.

* * * * *